(12) United States Patent
Aigner et al.

(10) Patent No.: US 12,320,472 B2
(45) Date of Patent: Jun. 3, 2025

(54) STORAGE TANK FOR LIQUID HYDROGEN WITH FILL LEVEL INDICATOR

(71) Applicant: Linde GmbH, Pullach (DE)

(72) Inventors: Herbert Aigner, Reut-Taubenbach (DE); Manfred Schönberger, Tacherting (DE)

(73) Assignee: LINDE GMBH, Pullach (DE)

( * ) Notice: Subject to any disclaimer, the term of this patent is extended or adjusted under 35 U.S.C. 154(b) by 268 days.

(21) Appl. No.: 17/907,494

(22) PCT Filed: Mar. 29, 2021

(86) PCT No.: PCT/EP2021/025118
§ 371 (c)(1),
(2) Date: Sep. 27, 2022

(87) PCT Pub. No.: WO2021/197668
PCT Pub. Date: Oct. 7, 2021

(65) Prior Publication Data
US 2023/0119178 A1    Apr. 20, 2023

(30) Foreign Application Priority Data
Apr. 2, 2020   (EP) ..................... 20020152

(51) Int. Cl.
*F17C 13/02*   (2006.01)
*F17C 13/08*   (2006.01)

(52) U.S. Cl.
CPC .......... *F17C 13/025* (2013.01); *F17C 13/082* (2013.01); *F17C 2221/012* (2013.01);
(Continued)

(58) Field of Classification Search
None
See application file for complete search history.

(56) References Cited

U.S. PATENT DOCUMENTS 2,756,765 A * 7/1956 Agule ................. H01J 9/38
62/50.7
3,031,887 A * 5/1962 Weisend ............... G01F 23/246
73/299

(Continued)

FOREIGN PATENT DOCUMENTS

| DE | 2524826 A1 | 12/1976 |
|---|---|---|
| EP | 3495711 A1 | 6/2019 |
| JP | S54153267 U | 10/1979 |

OTHER PUBLICATIONS

JPS54-153267 U English Machine Translation (Year: 2011).*
(Continued)

*Primary Examiner* — Jenna M Maroney
(74) *Attorney, Agent, or Firm* — Ryan Pool

(57) ABSTRACT

A storage tank for liquid hydrogen having an outer tank, an inner tank which is arranged inside the outer tank, and a device for indicating a predefined fill level has been reached with a cell which can be arranged inside the inner tank and is filled with a gas which liquefies when the cell is dipped into the liquid hydrogen, further having a pressure indicator device which indicates a pressure drop in the cell in the case of liquefaction of the gas and therefore indicates the predefined filling level has been reached, and further having a heating element which continuously introduces heat into the gas.

20 Claims, 4 Drawing Sheets

(52) U.S. Cl.
CPC ............ *F17C 2223/0161* (2013.01); *F17C 2250/0408* (2013.01); *F17C 2270/0105* (2013.01)

(56) References Cited

U.S. PATENT DOCUMENTS

| | | | | |
|---|---|---|---|---|
| 3,085,433 | A * | 4/1963 | Shmueli | G01F 23/246 |
| | | | | 73/290 R |
| 3,276,214 | A * | 10/1966 | Wilson | F17C 13/021 |
| | | | | 137/393 |
| 3,638,442 | A * | 2/1972 | Hedstrom | F17C 13/021 |
| | | | | 137/386 |
| 4,844,117 | A * | 7/1989 | Sung | F17C 13/026 |
| | | | | 60/527 |
| 5,393,736 | A * | 2/1995 | Hodge | G01F 23/24 |
| | | | | 338/80 |
| 6,073,081 | A * | 6/2000 | Hettinger | F17C 5/02 |
| | | | | 702/50 |
| 6,542,848 | B1 * | 4/2003 | Neeser | G01F 22/02 |
| | | | | 702/156 |
| 7,344,045 | B2 * | 3/2008 | Harper | F17C 1/00 |
| | | | | 220/62.18 |
| 2004/0226364 | A1 * | 11/2004 | Xu | G01F 23/246 |
| | | | | 73/304 R |

OTHER PUBLICATIONS

Shackelford, James F. Han, Young-Hwan Kim, Sukyoung Kwon, Se-Hun. (2015). CRC Materials Science and Engineering Handbook (4th Edition)—1.2 Chemical Properties. Table 1.164 Melting Points of the Elements(pp. 199). Taylor & Francis. (Year: 2015).*

* cited by examiner

STORAGE TANK FOR LIQUID HYDROGEN WITH FILL LEVEL INDICATOR

The invention relates to a storage tank for liquid hydrogen having an outer tank, an inner tank arranged inside the outer tank, and a device for indicating a predefined fill level has been reached. Furthermore, the present invention relates to a method for indicating a predefined fill level of a storage tank for liquid hydrogen has been reached.

In accordance with internal findings by the applicant with regard to the outer and inner tanks, storage tanks for liquid hydrogen in each case have a cylindrical geometry having a tubular base portion and two curved cover portions that close the base portion on the end face. Depending on the requirements, such a storage tank is filled with liquid hydrogen up to a predefined fill level. The predefined fill level can be reached, for example, when the storage tank is filled to approximately 88 to 95% with liquid hydrogen. In order to detect or indicate the predefined fill level has been reached, the applicant is aware of the company's internal prior art in which a fill level indicator is realized with the help of what is known as a differential pressure method. Furthermore, in accordance with internal findings by the applicant, capacitive measurement of the fill level is possible by changing the dielectric constant in the liquid hydrogen. As a result of the physical properties of hydrogen, a reliable fill level indicator can be implemented technically only in a very complicated manner. In this case, it is necessary to measure different physical quantities and to calculate them in a complex manner.

Against this background, the object of the present invention is to provide a storage tank for liquid hydrogen of the type mentioned at the outset, which storage tank is improved with respect to fill level measurement, and an improved fill level measurement method of a storage tank for liquid hydrogen.

Accordingly, a storage tank for liquid hydrogen is proposed having an outer tank, an inner tank arranged inside the outer tank, and a device for indicating a predefined fill level for the liquid hydrogen has been reached. The device comprises a cell that is arranged inside the inner tank and is filled with a gas that liquefies when the cell is dipped into the liquid hydrogen, a pressure indicator device that indicates a pressure drop in the cell in the case of liquefaction of the gas and therefore indicates the predefined fill level has been reached, and a heating element that continuously introduces heat into the gas.

Providing the heating element ensures that the gas in the cell does not liquefy before the liquid hydrogen flows around the cell or a predefined fill level has been reached. In addition, it is ensured that the gas in the cell is reliably vaporized again while the storage tank is being refilled and a reliable fill level measurement is also possible in closed and highly insulated tanks, such as a double-walled storage tank for hydrogen of the present kind. Furthermore, the required heat input is required only while the storage tank is being filled. A constant cold leak is thus excluded. The fill level measuring device described in JPS54153267U, which has no heating device, is disclosed for open Dewar vessels.

The device can also be referred to as an indicator device, as a limit transducer or as a limit transducer device. The storage tank comprises an outer tank, an inner tank arranged inside the outer tank, and preferably an insulating element arranged between the outer tank and the inner tank. The cell is arranged inside the inner tank. In addition to liquid hydrogen, the device can also be used for other cryogenic liquids. Examples of cryogenic fluids or liquids, or cryogens, include, for example, liquid helium, liquid nitrogen, or liquid oxygen.

The cell is then at least in part flowed around by the liquid hydrogen when the predefined fill level is reached. In the present case, a "cell" is understood to mean a component that encloses an interior space in which the gas is accommodated. The term "cell" can also be referred to herein using the term "tank". The cell can also be referred to as a gas cell or as a gas tank.

The gas can be any gas that has the property that it liquefies when the cell is dipped into the liquid hydrogen. Due to this phase transition of the gas from gaseous to liquid, a pressure drop occurs in the cell, which pressure drop can be detected or indicated by the pressure indicator device. The pressure drop is thus information that indicates the predefined fill level has been reached.

The pressure indicator device is preferably arranged outside the storage tank such that it can be viewed by a technician. The heating element is preferably an electrical heating element. The heating element can, for example, be an electrical resistor. The cell is thus heated and can be referred to as a heated cell. The fact that the heating element "continuously" introduces the heat into the gas in the present case means that the heating element is preferably energized during an entire filling process of the storage tank with the liquid hydrogen and thus introduces the heat into the gas. The heating element thus already introduces the heat into the gas before the cell is dipped into the liquid hydrogen. However, only enough heat is introduced into the gas so that it liquefies when the cell is dipped into the liquid hydrogen.

As soon as the cell is no longer flowed around by the liquid hydrogen or is no longer dipped therein, the gas is vaporized again by the heat introduced by the heating element. In the cell, there is then again a rise in pressure, which indicates a drop in the liquid level of the liquid hydrogen below the predefined fill level. Thus, only enough heat is introduced into the gas so that the gas liquefies when the cell is dipped into the liquid hydrogen and so that the gas is vaporized again as soon as the cell is no longer dipped into the liquid hydrogen.

For example, during the filling process, the heating element continuously introduces a heat output of 5 W into the gas. After completion of the filling process, the heating element is preferably no longer energized. Due to the heating element, it is not necessary to introduce heat from the outside of the storage tank into the cell or into the gas in order to vaporize the gas. As a result, as mentioned above, a constant cold leak, via which heat is introduced from the outside into the cell, can be excluded.

In accordance with one embodiment, the gas is neon.

However, any other gas can also be used. In particular, the boiling point of the gas accommodated in the cell is higher than the boiling point of the liquid hydrogen such that the gas is liquefied when the cell is dipped into the liquid hydrogen. The cell can be referred to as a neon cell, in particular as a heated neon cell.

In accordance with a further embodiment, the cell is spherical.

This results in the smallest possible surface area of the cell with the largest possible volume. However, the cell can also be cylindrical or cuboid or have any other geometry.

In accordance with a further embodiment, the device further comprises a line that carries the cell.

The line is in particular guided through a wall of the storage tank. The line can be, for example, a stainless steel line. The cell can be suspended on the line such that the line absorbs a weight of the cell. The line keeps the cell fixed in a predefined position. The cell can therefore not float on the liquid hydrogen.

In accordance with a further embodiment, the gas can be supplied to the cell with the help of the line, wherein a cable for energizing the heating element is guided through the line to the cell.

The line can thus fulfill a dual function, namely supplying the gas to the cell and accommodating the cable that leads to the heating element. In particular, the cable is accommodated centrally in the line. The cable can be accommodated in a protective tube that is arranged centrally in the line.

In accordance with a further embodiment, the device further comprises a valve by means of which the gas can be supplied to the line.

A nozzle, to which the valve is attached, can be provided on the line. With the help of the valve, the gas can be refilled or the gas can be introduced into the cell before the storage tank is filled.

In accordance with a further embodiment, the pressure indicator device is in fluid communication with the line.

The pressure indicator device is in fluid communication with the cell via the line. In the present case, "in fluid communication" means that the gas can flow via the line from the cell to the pressure indicator device and vice versa. The pressure indicator device can be attached to the previously mentioned nozzle, which also carries the valve.

In accordance with a further embodiment, the pressure indicator device is a pressure gage.

As a result, a simple construction of the device is possible. A technician filling the storage tank can easily recognize from the pressure drop that the predefined fill level is reached. However, the pressure indicator device can also be a pressure sensor or comprise a pressure sensor.

In accordance with a further embodiment, the heating element is arranged inside an interior space of the cell enclosed by the cell.

As a result, the heating element does not come into contact with the liquid hydrogen. Alternatively, however, the heating element can also be provided on the outside of the cell. However, the heating element is particularly preferably arranged in the interior space of the cell. The gas is also accommodated In the interior space.

In accordance with a further embodiment, the device further comprises a control unit for controlling the heating element.

In the simplest case, the control unit can be a switch that makes it possible to energize the heating element via the cable guided through the line. However, the control unit can also be a computer or comprise a computer. In the event that the pressure indicator device is a pressure sensor or comprises a pressure sensor, the control unit can also be suitable for detecting, evaluating and/or displaying sensor signals of the pressure indicator device.

The storage tank is particularly suitable for maritime applications. The storage tank can therefore be referred to as a maritime storage tank. For example, the storage tank can be mounted on a vehicle, in particular on a watercraft. Accordingly, a vehicle, in particular a watercraft, having such a storage tank is also proposed. The storage tank can also be referred to as a storage container, as a hydrogen storage container or as a hydrogen storage tank. The storage tank is preferably suitable for accommodating liquid hydrogen. The storage tank can, however, also be used for other cryogenic liquids. Examples of cryogenic fluids or liquids, or cryogens, include, for example, liquid helium, liquid nitrogen, or liquid oxygen.

In the storage tank, after or during the filling of the hydrogen, a gas zone having gaseous hydrogen and an underlying liquid zone having liquid hydrogen are formed. A phase boundary is provided between the gas zone and the liquid zone. As soon as the phase boundary reaches the predefined fill level, the storage tank is filled. After being filled into the storage tank, the hydrogen thus has two phases having different aggregate states, namely liquid and gaseous. The hydrogen can transition from the liquid phase into the gaseous phase and vice versa.

In accordance with one embodiment, a line of the device carrying the cell is fixedly connected to a wall of the storage tank.

For example, the line can be welded into the wall. The line is preferably a stainless steel line.

As explained above, the storage tank comprises an outer tank and an inner tank arranged inside the outer tank, wherein the cell is arranged inside the inner tank. Preferably, the outer tank and the inner tank are made of stainless steel. An insulating element for thermal insulation can be provided between the outer tank and the inner tank. The insulating element is used for thermal insulation of the inner tank. The aforementioned line can be welded to the outer tank and to the inner tank.

Furthermore, a method is proposed for indicating a predefined fill level of a storage tank for liquid hydrogen having an outer tank and an inner tank arranged inside the outer tank has been reached. The method comprises the following steps: a) dipping a cell arranged inside the inner tank into the liquid hydrogen when the predefined fill level is reached, wherein the cell is thereby dipped into the liquid hydrogen such that the hydrogen level or liquid level of the liquid hydrogen inside the inner tank rises up to the predefined fill level and the cell is at least in part flowed around by the liquid hydrogen, b) liquefying a gas accommodated in the cell with the help of the liquid hydrogen, c) continuously introducing heat into the gas with the help of a heating element, and d) indicating a pressure drop in the cell in the case of liquefaction of the gas and therefore that the predefined fill level has been reached with the help of a pressure indicator device.

As soon as the cell is at least in part flowed around by the liquid hydrogen, the gas accommodated in the cell is liquefied. In this case, only enough heat is introduced into the gas with the help of the heating element so that said gas liquefies when the cell is flowed around with the liquid hydrogen despite the heat input. The phase transition of the gas from gaseous to liquid leads to a pressure drop in the cell that is indicated with the help of the pressure indicator device. The pressure drop is therefore an indication that the predefined fill level is reached. However, as soon as the cell is no longer dipped into the liquid hydrogen, the gas is vaporized again with the help of the heating element. This phase transition leads to a pressure increase in the cell that is also indicated with the help of the pressure indicator device. The pressure rise is an indication that the hydrogen level has dropped below the predefined fill level.

In accordance with one embodiment, the heat is introduced into the gas during steps a), b), c) and d). This means that the heat is preferably introduced into the gas during the entire filling process of the storage tank with the liquid hydrogen. Preferably, the heating element only introduces heat into the gas during the filling process. Outside a filling process, the heating element preferably does not introduce any heat into the gas. In the case of an electrical heating element, said electrical heating element is preferably energized exclusively during the filling process. Thus, the electrical heating element is preferably not energized outside the filling process.

The embodiments and explanations given for the storage tank apply correspondingly to the method and vice versa.

In the present case, "a" is not necessarily to be understood as limiting to precisely one element. It is rather the case that several elements, such as two, three, or more, may also be provided. Any other number word used herein is also not to be understood as a limitation being given to precisely the number of elements mentioned. It is rather the case that, unless otherwise indicated, the number may deviate upwardly or downwardly.

Further possible implementations of the storage tank and/or of the method also include not explicitly mentioned combinations of features or embodiments described above or below with respect to the exemplary embodiments. A person skilled in the art will also add individual aspects as improvements or additions to the respective basic form of the storage tank and/or of the method.

Further advantageous embodiments and aspects of the storage tank and/or of the method are the subject matter of the dependent claims and of the exemplary embodiments of the storage tank and/or of the method described below. The storage tank and/or the method are explained below in more detail with reference to the accompanying figures based on preferred embodiments.

In the figures, the same or functionally equivalent elements have been provided with the same reference signs unless otherwise indicated.

Figure 1:
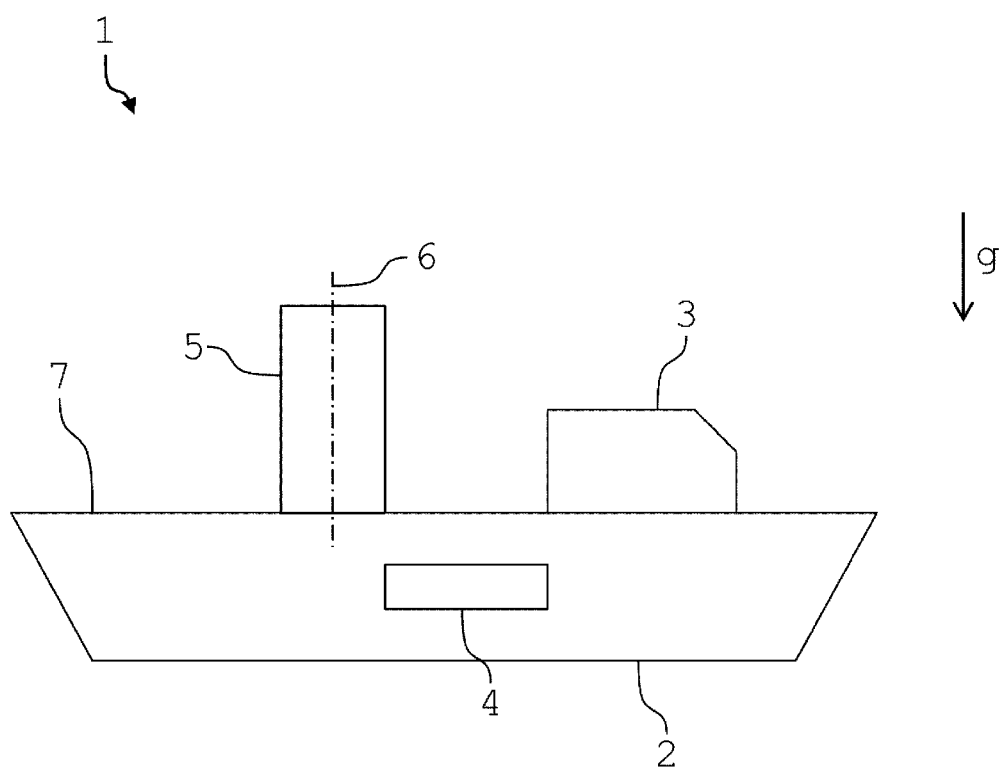
FIG. 1 shows a schematic side view of an embodiment of a vehicle.

FIG. 1 shows a highly simplified schematic side view of an embodiment of a vehicle 1. The vehicle 1 can be, for example, a maritime watercraft, in particular a ship. The vehicle 1 can be referred to as a maritime vehicle. In particular, the vehicle 1 can be a maritime passenger ferry. Alternatively, the vehicle 1 can also be a land vehicle. However, it is assumed below that the vehicle 1 is a watercraft.

The vehicle 1 comprises a hull 2 that is buoyant. A bridge 3 is provided at or on the hull 2. The vehicle 1 is preferably operated with hydrogen. For this purpose, the vehicle 1 can have a fuel cell 4. In the present case, a "fuel cell" is understood to mean a galvanic cell that converts the chemical reaction energy of a continuously supplied fuel, in the present case hydrogen, and an oxidant, in the present case oxygen, into electrical energy. By means of the electrical energy obtained, an electric motor (not shown) can be driven, for example, which electric motor in turn drives a ship's propeller for driving the vehicle 1.

A storage tank 5 for storing liquid hydrogen is provided for supplying the fuel cell 4 with hydrogen. The storage tank 5 is rotationally symmetrical with respect to a center axis or axis of symmetry 6. The storage tank 5 can be arranged, for example, inside the hull 2, in particular inside a machine room, on the bridge 3 or on a deck of the hull 2 functioning as a foundation 7. The axis of symmetry 6 is oriented along a direction of gravity g. That is, the storage tank 5 is positioned upright or vertically. Thus, the axis of symmetry 6 is perpendicular to the foundation 7. In the event that the vehicle 1 is, for example, a vehicle that is converted to a hydrogen drive, the storage tank 5 can also be placed, for example, in a chimney or a smokestack of the vehicle 1.

Figure 2:
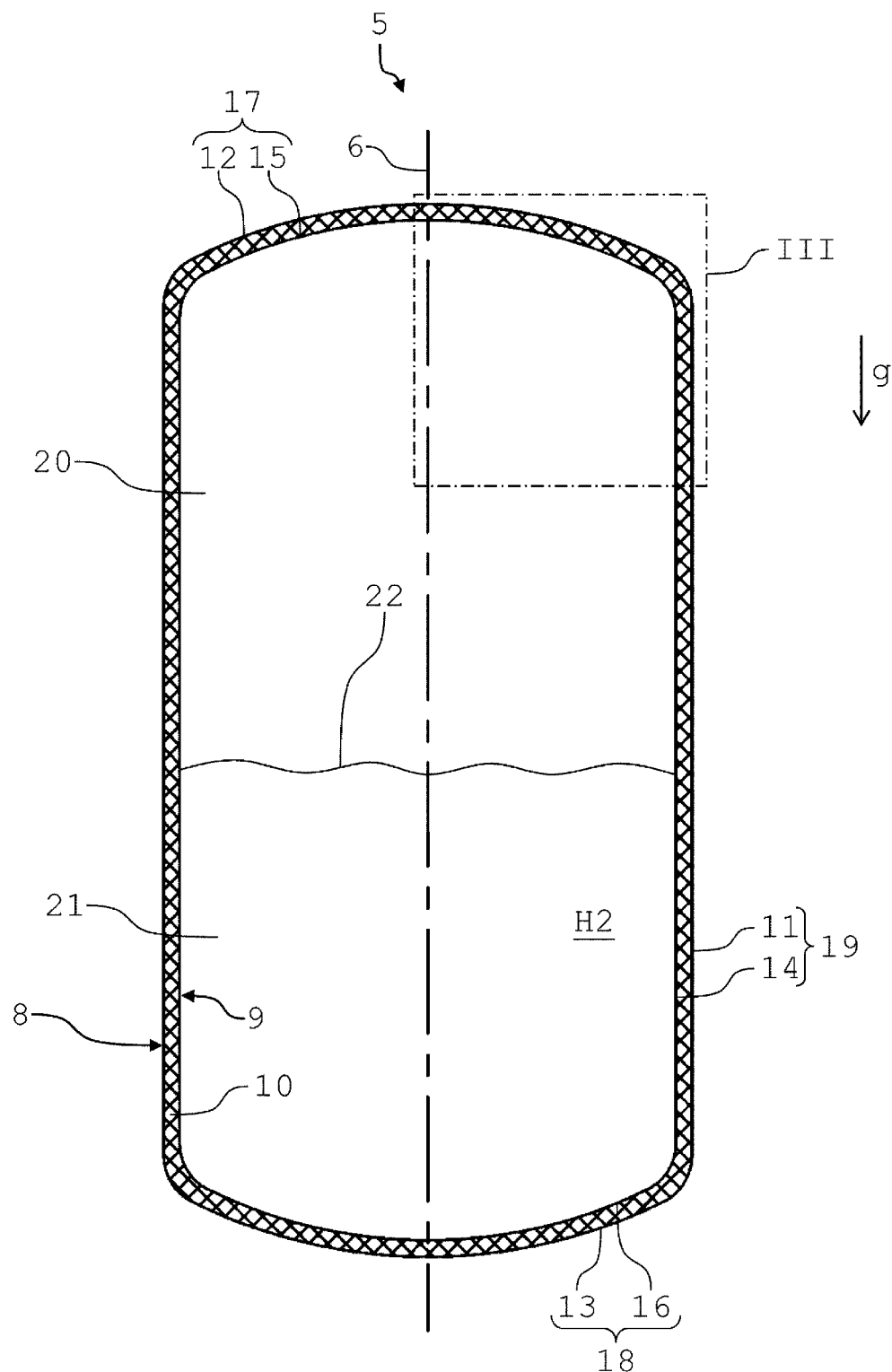
FIG. 2 shows a schematic sectional view of an embodiment of a storage tank for the vehicle in accordance with FIG. 1.

FIG. 2 shows a schematic sectional view of an embodiment of a storage tank 5 as mentioned above. The storage tank 5 can also be referred to as a storage container. As mentioned above, storage tank 5 is suitable for accommodating liquid hydrogen H2 (boiling point at 1 bara: 20.268 K=−252.882° C.). Therefore, the storage tank 5 can also be referred to as hydrogen storage tank or as a hydrogen storage container. The storage tank 5 can, however, also be used for other cryogenic liquids. Examples of cryogenic fluids or liquids, or cryogens for short, are, in addition to the aforementioned liquid hydrogen H2, liquid helium He (boiling point at 1 bara: 4.222 K=−268.928° C.), liquid nitrogen N2 (boiling point at 1 bara: 77.35 K=−195.80° ° C.) or liquid oxygen O2 (boiling point at 1 bara: 90.18 K=−182.97° C.).

The storage tank 5 is rotationally symmetrical with respect to the axis of symmetry 6. The storage tank 5 comprises an outer tank 8 that is rotationally symmetrical with respect to the axis of symmetry and an inner tank 9 that is rotationally symmetrical with respect to the axis of symmetry 6. The inner tank 9 is arranged completely inside the outer tank 8. An insulating element 10 is provided between the outer tank 8 and the inner tank 9. The insulating element 10 can be a multilayer insulation layer (MLI) or can be designed as such.

The outer tank 8 comprises a tubular or cylindrical base portion 11 that has a rotationally symmetrical design with respect to the axis of symmetry 6. The base portion 11 is closed at both ends by means of a cover portion 12 and a bottom portion 13. In the orientation of FIG. 2 or along the direction of gravity g, the cover portion 12 is arranged above the bottom portion 13. The cross section of the base portion 11 can have a circular or approximately circular geometry. The cover portion 12 and the bottom portion 13 are curved. The cover portion 12 and the bottom portion 13 are curved in opposite directions such that the cover portion 12 and the bottom portion 13 are curved outwards with respect to the base portion 11. The outer tank 8 is fluid-tight, in particular gas-tight.

The inner tank 9, like the outer tank 8, comprises a tubular or cylindrical base portion 14 that has a rotationally symmetrical design with respect to the axis of symmetry 6. In the orientation of FIG. 2, the base portion 14 is closed on the upper side by a cover portion 15 and on the underside of a bottom portion 16. The cross section of the base section 14 can have a circular or approximately circular geometry. The cover portion 15 and the bottom portion 16 are curved. In particular, the cover portion 15 and the bottom portion 16 are curved in opposite directions such that the cover portion 15 and the bottom portion 16 are curved outwards with respect to the base portion 14. The inner tank 9 is fluid-tight, in particular gas-tight. The outer tank 8 and/or the inner tank 9 can have a blow-off valve (not shown).

The two cover portions 12, 15 form, with the insulating element 10 located therebetween, a cover 17 of the storage tank 5. The two bottom portions 13, 16 form, with the insulating element 10 located therebetween, a bottom 18 of the storage tank 5, and the two base portions 11, 14 form, with the insulating element 10 located therebetween, a wall 19 of the storage tank 5 that extends rotationally symmetrically about the axis of symmetry 6.

The liquid hydrogen H2 is accommodated in the inner tank 9. As long as the hydrogen H2 is in the two-phase region, a gas zone 20 having vaporized hydrogen H2 and a liquid zone 21 having liquid hydrogen H2 can be provided in the inner tank 9. After being filled into the inner tank 9, the hydrogen H2 thus has two phases having different aggregate states, namely liquid and gaseous. That is to say, a phase boundary 22 between the liquid hydrogen H2 and the gaseous hydrogen H2 is present in the inner tank 9.

When such a storage tank 5 is filled with liquid hydrogen H2, it is necessary to be able to detect when the storage tank 5 is completely filled or when a predefined fill level in the storage tank 5 is reached. This prevents an overflow of the liquid hydrogen H2. For example, fill level detection can be realized by applying a differential pressure method. Furthermore, capacitive measurement can take place by changing the dielectric constant in the liquid hydrogen H2. However, these methods are complicated. As a result of the physical properties of hydrogen H2, reliable fill level detection is not provided or can be implemented technically only in a very complicated manner because different physical quantities have to be measured and calculated in a complex manner.

Figure 3:
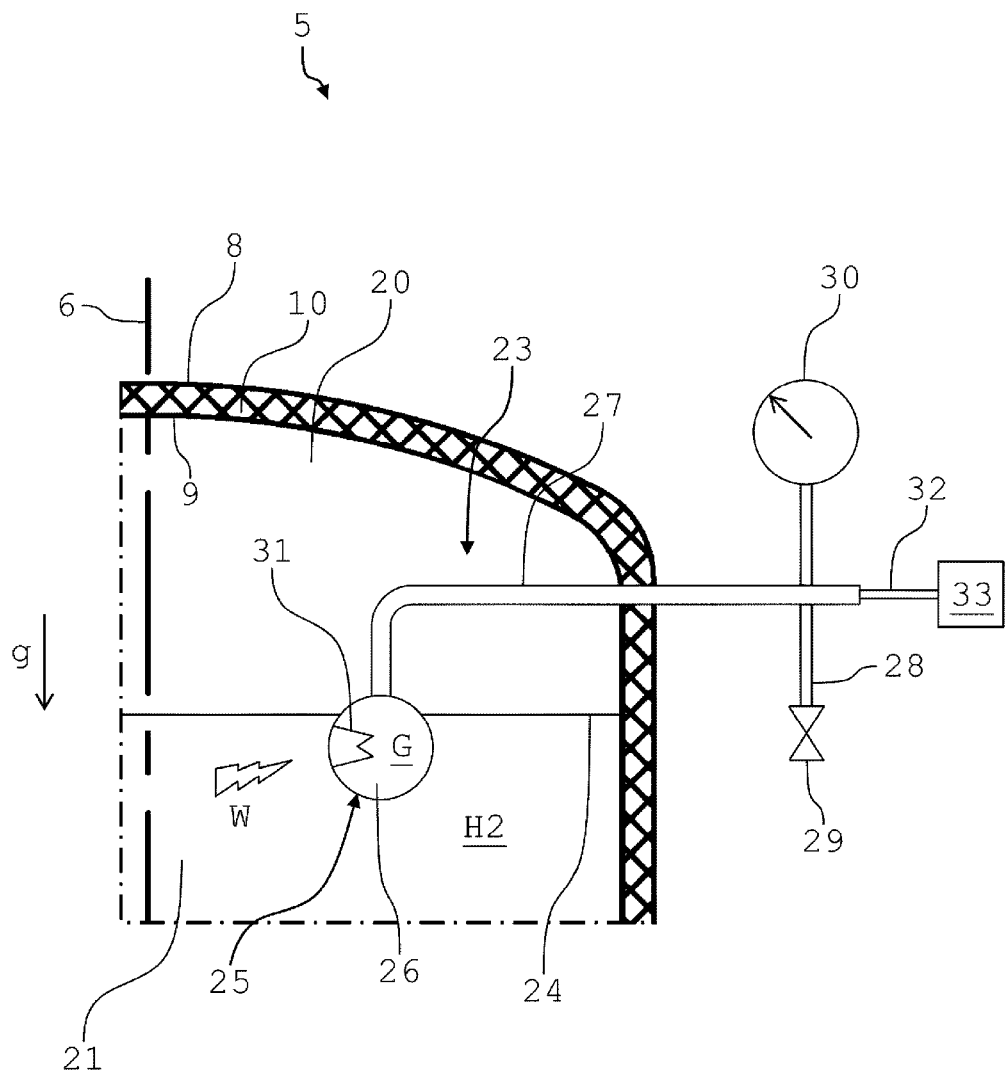
FIG. 3 shows the detailed view III in accordance with FIG. 2.

FIG. 3 shows the detailed view III in accordance with FIG. 2. The storage tank 5 comprises a device 23 (only shown in FIG. 3) for indicating a predefined fill level 24 with liquid hydrogen H2 in the storage tank 5. If the storage tank 5 is completely filled, the predefined fill level 24 corresponds to the phase boundary 22. The predefined fill level 24 is defined as a predefined position of a liquid column of the liquid hydrogen H2 accommodated in the storage tank 5. The predefined fill level 24 can be reached, for example, when the storage tank 5 is filled to 88% to 95% with liquid hydrogen H2. The predefined fill level 24 can also be referred to as a limit value or a predefined limit value.

The device 23 comprises a cell 25 that, when the predefined fill level 24 is reached, is dipped at least in part or completely into the liquid hydrogen H2. The cell 25 is arranged inside the inner tank 9 in the region of the cover 17. In the present case, a "cell" is understood to mean a closed volume. The cell 25 can be made of stainless steel. The cell 25 can be spherical. Alternatively, the cell 25 can also be cuboid or cylindrical. The geometry of the cell 25 is arbitrary.

The cell 25 encloses an interior space 26 in which a gas G is accommodated that liquefies when the cell 25 is in contact with the liquid hydrogen H2. The gas G can, for example, be neon Ne (boiling point at 1 bara: 27.07 K=−246.08° C.). The cell 25 can therefore be referred to as a neon cell. However, other suitable gases can also be used. The boiling point of the gas G accommodated in the cell 25 is higher than the boiling point of the liquid hydrogen H2 such that the gas G is liquefied when the cell 25 is dipped into the liquid hydrogen H2.

The cell 25 is fixedly mounted on the storage tank 5 with the help of a line 27. The line 27 is guided through the inner tank 9, the insulating element 10 and the outer tank 8. For example, the line 27 is welded to the storage tank 5. The gas G can be introduced into the cell 25 through the line 27. For this purpose, a nozzle 28 having a valve 29 can be provided on the line 27. The cell 25 can be filled with the gas G via the valve 29. The line 27 can be made of stainless steel.

Furthermore, the device 23 comprises a pressure indicator device 30 that indicates a pressure drop in the cell 25 in the case of liquefaction of the gas G and therefore indicates the predefined fill level 24 has been reached. The pressure indicator device 30 can be a pressure gage. However, the pressure indicator device 30 can also be a pressure sensor or comprise a pressure sensor. The pressure indicator device 30 can be attached to the nozzle 28. That is to say that both the valve 29 and the pressure indicator device 30 can be mounted on the nozzle 28. The nozzle 28 can be welded or soldered to the line 27, for example.

The device 23 further comprises a heating element 31 that is suitable for introducing heat W into the cell 25 or into the gas G. The cell 25 is thus heated. The cell 25 can therefore also be referred to as a heated cell, in particular as a heated neon cell. The heating element 31 can be an electric heating element. The heating element 31 can be arranged in the interior space 26. Alternatively, the heating element 31 can also be provided on the outside of the cell 25, for example. The heating element 31 is energized with the help of a cable 32 guided through the line 27. The cable 32 is guided centrally in the line 27 such that the gas G can be supplied around the cable 32 through an annular opening of the cell 25.

A control unit 33 that is arranged outside the storage tank 5 can be assigned to the heating element 31. In the simplest case, the control unit 33 is a switch that is actuated before or during filling of the storage tank 5 in order to energize the heating element 31. However, the control unit 33 can also be a computer or comprise a computer. In the event that the pressure indicator device 30 is a pressure sensor or comprises a pressure sensor, the control unit 33 can also be suitable for processing a signal of the pressure indicator device 30.

The functionality of the device 23 is explained below. Depending on the requirements, the predefined fill level 24 can be selected such that the storage tank 5 is filled to 88 to 95% when the predefined fill level 24 is reached. When the storage tank 5 is filled, the filling must be ended when the predefined fill level 24 is reached in order to prevent an overflow of the liquid hydrogen H2. Before the storage tank 5 is filled, the cell 25 is filled with the gas G or the cell 25 is already filled with the gas G.

The heating element 31 is energized during the filling of the storage tank 5 such that it continuously provides approximately 5 W of heat output and introduces the heat W into the gas G. When the cell 25 is dipped into the liquid hydrogen H2, i.e., when the predefined fill level 24 is reached and the cell 25 is at least in part flowed around by liquid hydrogen, the gas G liquefies, and there is a pressure drop in the interior space 26 of the cell 25, which pressure drop can be indicated with the help of the pressure indicator device 30. The heat output of the heating element 31 is such that the gas G liquefies when the cell 25 is dipped into the liquid hydrogen H2 despite the introduced heat W. In the case of a decreasing hydrogen level, the heating element 31 ensures that the liquid gas G is vaporized again. This leads to a pressure increase in the cell 25. The pressure indicator device 30 can then be used to recognize that the hydrogen level has dropped below the predefined fill level 24.

With the help of the heating element 31, it is also ensured that the required input of heat W is required only during the measurement task. A constant cold leak is thus excluded. An unambiguous indication of the predefined fill level 24 having been reached is possible with the help of the device 23.

Figure 4:
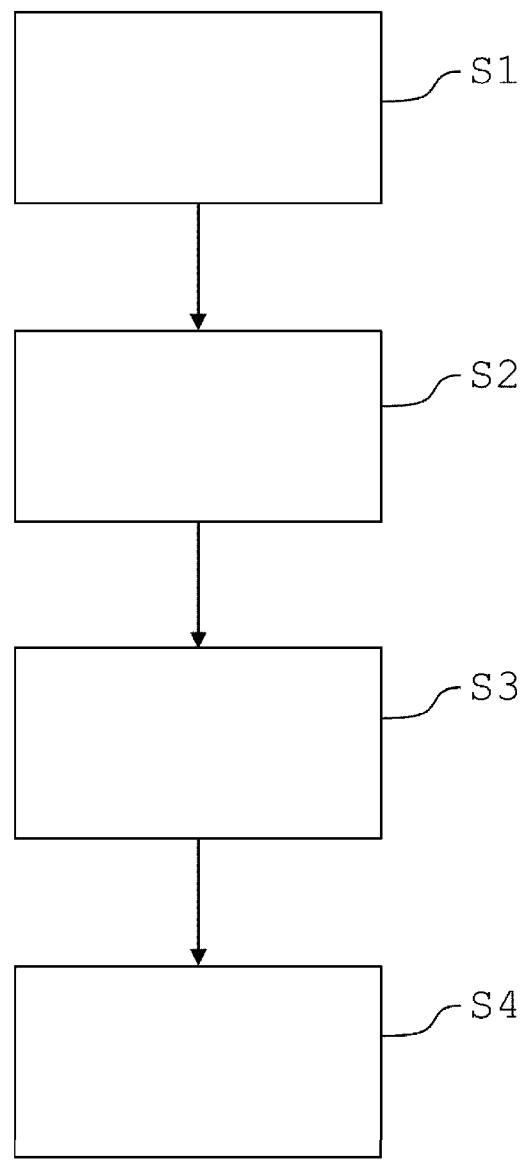
FIG. 4 shows a schematic block diagram of an embodiment of a method for indicating a predefined fill level of the storage tank in accordance with FIG. 2 has been reached.

FIG. 4 is a schematic block diagram of an embodiment of a method for indicating the predefined fill level 24 has been reached. The method is carried out with the help of the device 23. In a step S1, the cell 25 arranged inside the storage tank 5 is dipped into the liquid hydrogen H2. The dipping takes place when the predefined fill level 24 is reached, i.e., when the hydrogen level in the storage tank 5 rises up to the predefined fill level 24 and the liquid hydrogen at least in part flows around the cell 25. Dipping the cell 25 therefore does not take place by moving the cell 25. The cell 25 is arranged in a stationary manner inside the inner tank 9.

In a step S2, the gas G accommodated in the cell 25 is liquefied with the help of the liquid hydrogen H2. The liquid hydrogen H2 at least in part flows around the cell 25 and removes heat from the gas G, as a result of which said gas liquefies. At the same time, heat W is continuously introduced into the gas G with the help of the heating element 31 in a step S3. The heat output is, for example, 5 W. However, the introduced heat W does not prevent the liquefaction of the gas G when the cell 25 is dipped into the liquid hydrogen H2. As soon as the cell 25 is no longer dipped into the liquid hydrogen H2 or is no longer flowed around or surrounded by liquid hydrogen, the gas G is vaporized again with the help of the introduced heat W.

In a step S4, a pressure drop in the cell 25 in the case of liquefaction of the gas G is indicated with the help of the pressure indicator device 30. The pressure drop in turn indicates that the predefined fill level 24 is reached. The pressure drop results from the phase transition of the gas G from its gaseous state to the liquid state. Conversely, the pressure rises again as soon as the cell 25 is no longer dipped into the liquid hydrogen H2 and the gas G is vaporized with the help of the heating element 31. The heat W is preferably introduced continuously into the gas G during all steps S1 to S4.

Although the present invention has been described with reference to exemplary embodiments, it can be modified in many ways within the scope of the claims.

REFERENCE SIGNS USED

1 Vehicle
2 Hull
3 Bridge
4 Fuel cell
5 Storage tank
6 Axis of symmetry
7 Foundation
8 Outer tank
9 Inner tank
10 Insulating element
11 Base portion
12 Cover portion
13 Bottom portion
14 Base portion
15 Cover portion
16 Bottom portion
17 Cover
18 Bottom
19 Wall
20 Gas zone
21 Liquid zone
22 Phase boundary
23 Device
24 Fill level
25 Cell
26 Interior space
27 Line
28 Nozzle
29 Valve
30 Pressure indicator device
31 Heating element
32 Cable
33 Control unit
g Direction of gravity
G Gas
H2 Hydrogen
S1 Step
S2 Step
S3 Step
S4 Step
W Heat

The invention claimed is:
1. A storage tank for liquid hydrogen comprising:
an outer tank,
an inner tank arranged inside the outer tank,
a device for indicating a predefined fill level of liquid hydrogen has been reached, the device comprising a cell that is arranged inside the inner tank and is filled with a gas that liquefies when the cell is dipped into the liquid hydrogen,
a pressure indicator device that indicates a pressure drop in the cell in the case of liquefaction of the gas and therefore indicates a predefined fill level has been reached, and
a heating element that continuously introduces heat into the gas, wherein the heating element is arranged within the gas filled interior space of the cell, and
wherein the cell is spherical.
2. The storage tank in accordance with claim 1, wherein the predefined fill level of liquid hydrogen corresponds to a level of liquid hydrogen at which the storage tank is filled 88% to 95% with liquid hydrogen.
3. A storage tank for liquid hydrogen comprising:
an outer tank,
an inner tank arranged inside the outer tank,
a device for indicating a predefined fill level of liquid hydrogen has been reached, the device comprising a cell that is arranged inside the inner tank and is filled with a gas that liquefies when the cell is dipped into the liquid hydrogen,
a pressure indicator device that indicates a pressure drop in the cell in the case of liquefaction of the gas and therefore indicates a predefined fill level has been reached, and
a heating element that continuously introduces heat into the gas,
wherein the heating element is arranged within the gas filled interior space of the cell.
4. The storage tank in accordance with claim 3, wherein the gas is neon.
5. The storage tank in accordance with claim 3, further comprising a line that carries the cell.
6. The storage tank in accordance with claim 5, wherein the gas can be supplied to the cell with the help of the line, and wherein a cable for energizing the heating element is guided through the line to the cell.
7. The storage tank in accordance with claim 5, further comprising a valve by means of which the gas can be supplied to the line.
8. The storage tank in accordance with claim 5, wherein the pressure indicator device is in fluid communication with the line.
9. The storage tank in accordance with claim 3, wherein the pressure indicator device is a pressure gauge.
10. The storage tank in accordance with claim 3, wherein the heating element is arranged inside an interior space of the cell enclosed by the cell.
11. The storage tank in accordance with claim 10, wherein the cell is arranged at the predefined fill level in an upper region of the inner tank adjacent a cover of the inner tank.

12. The storage tank in accordance with claim 3, further comprising a control unit for actuating the heating element.

13. The storage tank in accordance with claim 3, wherein a line of the device carrying the cell is fixedly connected to a wall of the storage tank.

14. The storage tank in accordance with claim 3, wherein the cell is arranged at the predefined fill level in an upper region of the inner tank adjacent a cover of the inner tank.

15. The storage tank in accordance with claim 3, further comprising an insulating element arranged between the outer tank and the inner tank.

16. The storage tank in accordance with claim 3, wherein the predefined fill level of liquid hydrogen corresponds to a level of liquid hydrogen at which the storage tank is filled 88% to 95% with liquid hydrogen.

17. A method for indicating a predefined fill level of a storage tank for liquid hydrogen comprising an outer tank and an inner tank arranged inside the outer tank has been reached, comprising:
   a) dipping a spherical cell arranged inside the inner tank into the liquid hydrogen when the predefined fill level is reached, wherein the cell is thereby dipped into the liquid hydrogen such that the liquid level of the liquid hydrogen inside the inner tank rises up to the predefined fill level and the cell is at least in part flowed around by the liquid hydrogen,
   b) liquefying a gas accommodated in the cell with the help of the liquid hydrogen,
   c) continuously introducing heat into the gas with the help of a heating element that is positioned within the gas filled interior space of the cell, and
   d) indicating a pressure drop in the cell in the case of liquefaction of the gas and therefore that the predefined fill level has been reached with the help of a pressure indicator device.

18. The method in accordance with claim 17, wherein the heat is introduced into the gas during steps a), b), c) and d).

19. A storage tank for liquid hydrogen comprising:
   an outer tank,
   an inner tank arranged inside the outer tank,
   a device for indicating a predefined fill level of liquid hydrogen has been reached, the device comprising a cell that is arranged inside the inner tank and is filled with a gas that liquefies when the cell is dipped into the liquid hydrogen,
   a pressure indicator device that indicates a pressure drop in the cell in the case of liquefaction of the gas and therefore indicates a predefined fill level has been reached, and
   a heating element that continuously introduces heat into the gas, wherein the heating element is arranged within the gas filled interior space of the cell, and
   wherein the cell is arranged at the predefined fill level in an upper region of the inner tank adjacent a cover of the inner tank.

20. The storage tank in accordance with claim 19, wherein the predefined fill level of liquid hydrogen corresponds to a level of liquid hydrogen at which the storage tank is filled 88% to 95% with liquid hydrogen.

* * * * *